(12) United States Patent
Sun

(10) Patent No.: US 8,357,312 B2
(45) Date of Patent: Jan. 22, 2013

(54) ELECTRICALLY CONTROLLED MEDIUM FOR MODULATING LIGHT

(75) Inventor: Gang Sun, Beijing (CN)

(73) Assignee: Beijing Halation Technology Co., Ltd., Beijing (CN)

( * ) Notice: Subject to any disclaimer, the term of this patent is extended or adjusted under 35 U.S.C. 154(b) by 0 days.

(21) Appl. No.: 12/988,620

(22) PCT Filed: May 16, 2008

(86) PCT No.: PCT/CN2008/070986
§ 371 (c)(1),
(2), (4) Date: Oct. 19, 2010

(87) PCT Pub. No.: WO2009/111919
PCT Pub. Date: Sep. 17, 2009

(65) Prior Publication Data
US 2011/0080553 A1   Apr. 7, 2011

(30) Foreign Application Priority Data

Mar. 14, 2008   (CN) .......................... 2008 1 0102000

(51) Int. Cl.
C09K 19/00 (2006.01)
C09K 19/06 (2006.01)
C09K 19/32 (2006.01)
C09K 19/52 (2006.01)
G03C 1/1333 (2006.01)

(52) U.S. Cl. ............. 252/299.01; 252/299.6; 252/299.7; 428/1.1; 428/1.3; 349/1; 349/56; 349/86; 349/182; 349/184

(58) Field of Classification Search ................ 349/1, 56, 349/86, 182, 184; 430/20; 428/1.1; 252/299.01, 252/299.6
See application file for complete search history.

(56) References Cited

U.S. PATENT DOCUMENTS

| 5,056,898 | A | 10/1991 | Ma et al. |
| 5,227,904 | A | 7/1993 | Nakanowatari |
| 5,530,566 | A | 6/1996 | Kumar |
| 5,729,320 | A | 3/1998 | Eidenschink et al. |
| 6,122,024 | A | 9/2000 | Molsen et al. |
| 6,924,873 | B2 * | 8/2005 | Asada ........................ 349/172 |
| 7,264,851 | B2 | 9/2007 | Sikharulidze |
| 7,397,530 | B2 | 7/2008 | Dyrli et al. |
| 7,916,248 | B2 | 3/2011 | Crossland et al. |
| 2002/0005930 | A1 | 1/2002 | Sonehara |
| 2008/0018845 | A1 | 1/2008 | Choi |
| 2010/0014011 | A1 | 1/2010 | Mottram et al. |
| 2010/0059273 | A1 | 3/2010 | Montbach et al. |

FOREIGN PATENT DOCUMENTS

| CN | 2661884 Y | 12/2004 |
| CN | 101059607 A | 10/2007 |
| CN | 101075050 A | 11/2007 |
| GB | 2274649 A | 8/1994 |
| JP | 10-148849 A | 6/1998 |
| WO | WO 2010/070606 A1 | 6/1924 |
| WO | WO 86/04324 A1 | 7/1986 |
| WO | WO 2004/022670 A1 | 3/2004 |

OTHER PUBLICATIONS

C.M. Lampert, "Large-area Smart Glass and Integrated Photovoltaics," Solar Energy Materials & Solar Cells 76 (2003) pp. 489-499.
Hideo Fujikake, "Advanced Flexible Liquid-Crystal Display Technologies," 2008 SPIE Newsroom, NHK Science and Technical Research Laboratories, Tokyo, Japan: pp. 1-3.
Buyuktanir et al., "Flexible Bistable Smectic—A Polymer Dispersed Liquid Crystal Display," Japanese Journal of Applied Physics, vol. 45, No. 5A, 2006, pp. 4146-4151.
Gardiner et al., "High-efficiency multistable switchable glazing using smectic A liquid crystals," Solar Energy Materials & Solar Cells, vol. 93, 2009, pp. 301-306.
Lin et al., "P-152: High Performance Reflective and Transflective Displays Using Guest-Host Liquid Crystal Gels," SID 06 Digest, pp. 780-782, 2006.

* cited by examiner

*Primary Examiner* — Geraldina Visconti
(74) *Attorney, Agent, or Firm* — Morgan, Lewis & Bockius LLP

(57) ABSTRACT

An electrically controlled medium for modulating light includes two plastic thin film layers (1) and (2), and a mixture layer (3) is arranged between the two plastic thin film layers (1) and (2). The mixture layer (3) is consisted of smectic liquid crystals (31), polymer materials (33) and dopants (32). Electrode layers (4) are coated on one side of each of the two plastic thin film layers (1) and (2) facing to the mixture layer (3), and the electrode layers (4) are connected to a device of electrical driving system (5). The liquid crystal molecules are allowed to exhibit different molecule alignments by controlling the amplitude, frequency and driving time of the electric power applied to the electrode layers (4), so that the electrically controlled medium for modulating light can be switched between a blurredly scattering state and a fully transparent state, even may be switched among a plurality of gradual translucent states of different gray levels. The medium is power saving, hard to be broken and eco friendly and it can maintain its state after power is off (memory effect). It has fast switching speed and can be broadly used for the fields of architectural decoration, privacy control areas, automotive electronics and glass, etc.

14 Claims, 5 Drawing Sheets

ELECTRICALLY CONTROLLED MEDIUM FOR MODULATING LIGHT

TECHNICAL FIELD

The invention relates to an electrically controlled medium for modulating light, for example for an medium which can switches states between a blurredly scattering state and a fully transparent state or between a colour shading state and a fully transparent state by controlling electrical signals applied to the electrode layers.

BACKGROUND ART

At present, the medium which has light modulation effect is mainly classified as four techniques, such as electrochromism, photochromism, thermochromism and piezochromism, wherein the light modulation medium made by photochromism, thermochromism and piezochromism are not completely actively controlled and are significantly influenced by environmental factors.

The well-known light modulation medium invented by Koreans is a suspended particle type light modulating glass made by the electrochromism technique. The glass regulates ray transmission and scattering degrees by controlling the amount of suspended particles between two layers of the light modulating glass. The light modulating glass has the defects of high cost and strict requirements for operation and use conditions in the purpose of preventing particle leakage. Apart from the electrochromism technique, light modulation can also be realized by a mechanical method (referring to PRC utility model patent ZL200320116206.8). The mechanical method is mainly realized by arranging two reels at the two ends of a hollow sandwich glass and wrapping various color films on the reels. When shielding is required, the film of one color is rotated out for shielding. When light transmission is required, the color films are retracted by a motor controlling the reels. So, the work principle is similar to that of a roadside rotating advertisement carrier used in daily life. The difference from the carrier lies in that the thickness can be controlled thinner. The mechanical method has the worst defect that the glass needs to be manually operated and is inconvenient in use.

Besides, a well known light modulation medium, as shown in FIGS. 8 to 10, is an electro-light modulating glass realized by Polymer Dispersed Liquid Crystal (PDLC) technique. The PDLC technique mainly is switched between transmission and scattering in a macroscopic state by controlling the alignment of a liquid crystal after the nematic liquid crystal is mixed with molecular polymers and making the liquid crystal have different refraction indices. Specifically, the technique comprises the following steps: mixing a proper amount of nematic liquid crystal with a certain number of molecular monomers, filling the mixture in the gap between two layers of glass 101 (of a certain thickness) or two layers of plastic substrates 101 to form a mixture layer 103, plating transparent electrodes 102 on the opposite surfaces of the two layers of glass or plastic substrates 101, as shown in FIG. 8, and making the molecular monomers having chemical change and condensed into molecular polymers by carrying out illumination processing with ultraviolet rays of certain wavelength and strength. The polymers are transparent. The liquid crystal molecules are uniformly mixed with the molecular polymers. Therefore, in the process for forming the molecular polymers, the liquid crystal molecules are uniformly cut into small bubble spaces, in other words, the molecular polymers and the liquid crystal molecules are no longer in a mixed state but in a phase separated state, and the molecular polymers bear countless small liquid crystal bubbles. As shown in FIG. 9, with no electric power applied, the alignment of the liquid crystal molecules 201 does not show strong orientation for the different liquid crystal bubbles 220, but is in a relatively random state as a whole. The bonder edge of the liquid crystal bubbles 220 and the molecular polymer carriers 202 has large and irregular change in refraction rates by reason of the anisotropy of the liquid crystal molecules 201 and the refraction rate difference of the large area of molecular polymer carriers 202. Thus, incident rays 210 from one side of the glass or the plastic substrates 101 are scattered in the mixture layer, and the scattered rays 211 are reflected to different directions. The liquid crystal bubbles 220 are small in volume and have large contact area with the molecular polymer carrier 202, so the glass produces obvious scattering phenomena without transmission like a frosted glass. The alignment of the liquid crystal molecules 201 can be controlled to make a change by controlling the electric power applied to the electrodes on the two sides of the glass or plastic substrates 101, as shown in FIG. 10. For example, when AC voltage signals (30V to 200V more or less) of a certain frequency are applied by a power supply 300, the liquid crystal molecules 201 are aligned into an ordered state from a random state. The liquid crystal molecules 201 are aligned in the same direction, and the liquid crystal bubbles 220 are uniformly dispersed in the molecular polymer carriers 202, so when the incident rays 210 pass through the mixture layer, there is a small change in the refraction rate of the rays in the direct incidence direction of the rays. Natural rays 211 are reflected under the condition of weak scattering, producing a certain transparent effect. The electrical light modulating glass applying PDLC technique has strong transparency. However, the PDLC technique is not multi-stable, and the transparent state needs to be maintained by continuously supplying power.

CONTENT OF THE INVENTION

The invention aims to provide an electrically controlled medium for modulating light which can switches states between a fully transparent state and a blurredly scattering state by controlling the amplitude, frequency and driving time of the electric power applied to the electrode layers by a device of electrical driving system.

In order to achieve the purpose above, the invention uses the following technical scheme:

An electrically controlled medium for modulating light, in which the medium includes two plastic thin film layers, and a mixture layer is arranged between the two plastic thin film layers, The mixture layer is consisted of smectic liquid crystals, polymer materials and dopants; Electrode layers are coated on one side of each of the two plastic thin plastic film layers facing to the mixture layer, and the electrode layers are connected to a device of electrical driving system.

Spacer balls or spacer rods are uniformly mixed in the mixture layer for controlling the thickness of the mixture layer, the thickness of the mixture layer is in the range of 5 µm to 20 µm, and the thickness of the electrically controlled medium for modulating light is in the range of 100 µm to 400 µm. The polymer materials is formed from monomers by thermal curing or ultraviolet curing. The weight rate of the monomers to the smectic liquid crystals is less than 3:10, and the weight rate of the dopants to the smectic liquid crystals is less than 1:100.

The smectic liquid crystals include Smectic-A liquid crystal organic compound, the monomers are any one of Norland optical adhesive 65 (NOA65), Norland optical adhesive 63

(NOA63), Norland optical adhesive 68 (NOA68) and Norland optical adhesive 7x (NOA7x), and the dopants are conductive compound.

The formula of the liquid crystal molecules are:

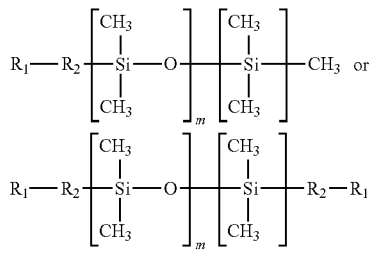

Wherein, R1 refers to 4-alkenoxy-4' cyanobiphenyl component, and R2 refers to alkyl chain.

The value of m is in the range of 1 to 4, and the number of carbons in R2 is in the range of 3 to 15.

The dopants are cetyl trimethyl ammonium bromide (CTAB) or hexadecyl trimethyl ammonium perchlorate (HMAP) and the mixture layer is also mixed with dichroic dyes.

While in use, the liquid crystal molecules are allowed to exhibit different molecule alignments by controlling the amplitude, frequency and driving time of the electric power applied to the electrode layers, the electrically controlled medium for modulating light can be switched between a blurredly scattering state and a fully transparent state, even may be switched among a plurality of gradual translucent states of different gray levels. If a dichroic dye is added to the smectic liquid crystals, the liquid crystal molecules are allowed to exhibit different molecule alignments by controlling the amplitude, frequency and driving time of the electric power applied to the electrode layers, the electrically controlled medium for modulating light can be switched between a fully transparent state and a colour shading state.

The invention has the advantages that:

1. The molecules of the smectic liquid crystals can exhibit different molecule alignments by controlling the electric signals applied on the electrode layers. As a consequence, the medium can switch states between a blurredly scattering state and a fully transparent state, and even may be switched among a plurality of gradual translucent states of different gray levels. The transmittance of the medium is over 80% when the LC molecular is on fully transparent state. When the LC molecular is on a blurredly scattering state and the scattering state is very stable and the medium can meet the light modulating requirements.

2. The light modulating medium could keep the same optical transmittance state even when the power is off, and the medium also has multi-stable property. The medium requires low driving current. Power consumption was needed only when changing the alignment states of the liquid crystal molecules. The medium is eco friendly because of the medium has less electromagnetic radiation and toxic.

3. The conversion between a blurredly scattering state and a fully transparent state needs a very short time, from several milliseconds to tens of milliseconds on average. It could be faster when the medium is switched to different gray levels.

4. The medium consists of a thin mixture layer and plastic thin film layers, so the medium is very thin. The polymer materials is formed from monomers by thermal curing or ultraviolet curing, and the two plastic thin film layers can be well bonded together by the polymer materials, so the medium having the advantages of pressure and crack resistance can be arbitrarily attached to flat or curved objects, such as glass, rigid plastic, walls, etc.

5. The medium can show different colors when it was mixed with dichroic dyes, If the electrode layers are cut into a plurality of strip-shaped electrodes arranged in parallel, and formed a pixel array between the two electrode layers, various patterns, figures or words can be displayed on the medium by controlling electric signals so the medium can even be used as monitors.

The electrically controlled medium for modulating light can be broadly used for the fields of architectural decoration, privacy control areas, automotive electronics and glass, etc.

MODE OF CARRYING OUT THE INVENTION

Figure 1:
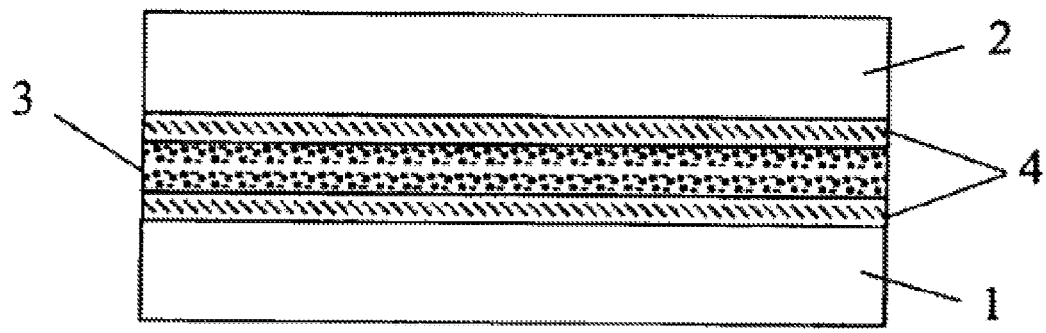
FIG. 1 is a side sectional view showing an LC structure of the electrically controlled medium for modulating light.

Further advantages of the invention are set out in the following description.

Embodiments of invention will be described, by the way of example, with reference to the drawings of which:

As shown in FIG. 1 to FIG. 4, the electrically controlled medium for modulating light includes two plastic thin film layers (1) and (2), a mixture layer (3) is arranged between the two plastic thin film layers (1) and (2), and the mixture layer (3) is consisted of smectic liquid crystals (31), polymer materials (33) and dopants (32). The plastic thin film layers (1) and (2) can be transparent plastic films. In general, the molecular clusters of the smectic liquid crystals (31) are aligned into a stacked structure from −20° C. to 70° C., as a sticky form. Electrode layers (4) are coated on one side of each of the two plastic thin film layers (1, 2) facing to the mixture layer (3). The electrode layers (4) are connected to a device of electrical driving system (5), and the two electrode layers (4) form a large area of capacitor structure with the middle mixture layer (3). The electrode layers (4) are formed from transparent materials, such as indium tin oxide (ITO), etc, and auxiliary metal electrodes like aluminium, copper, silver, etc can be used according to requirements.

In the mixture layer (3), the polymer materials (33) is formed from monomers by thermal curing or ultraviolet curing. The monomers could be any one of Norland optical adhesive 65 (NOA65), Norland optical adhesive 63 (NOA63), Norland optical adhesive 68 (NOA68) and Norland optical adhesive 7x (NOA7x). (The materials such as NOA65, etc are products invented by Norland Company, and can be purchased on the market.) The smectic liquid crystal (31) is a Smectic-A liquid crystal organic compound, for example, a siloxane compounds. The dopants are conductive compounds, such as cetyl trimethyl ammonium bromide (CTAB) or hexadecyl trimethyl ammonium perchlorate (HMAP). As the polymer materials (33) performs the function of bonding the two plastic thin film layers (1, 2), and the smectic liquid crystals (31) birefringence property performs the function of light refraction, so the amount of the monomers used is not very large when the mixture layer (3) is made. The weight rate of the monomers to the smectic liquid crystal (31) is generally controlled less than 3:10. The more the monomers used, the poorer the scattering effect is. The conductivity of the mixture layer (3) is mainly increased by the dopants. The dopants are driven to move under the application of driving signals, and the alignment of the smectic liquid crystal (31) is changed. Therefore, the amount of the dopants used should be small otherwise it is difficult to be driven. The weight rate of the dopants to the smectic liquid crystal (31) is generally controlled less than 1:100. In order to make better effect, the weight rate of the monomers to the smectic liquid crystals (31) can be further controlled less than 15:100, and the weight rate of the dopants to the smectic liquid crystals (31) can be further controlled less than 0.1:100.

In actual application, the medium is produced by the following steps: First, mixing the smectic liquid crystals (31), the monomers and the dopants according to the ratios above; Then, filling the mixture in the gap between the plastic thin film layers (1, 2); Finally, carrying out thermal curing or ultraviolet curing for the monomers for 3 to 10 minutes at a temperature below 150° C. (for example, the NOA65 material is Polymerized under the application of 365 nm ultraviolet rays) to prepare the polymer materials (33). As the monomers are uniformly dispersed with the smectic liquid crystals (31) before polymerization, the formed polymer chains are uniformly dispersed regularly among the smectic liquid crystals (31), and the medium is then formed.

In the mixture layer (3), when the molecules of the smectic liquid crystals (31) are regularly aligned, as the refractive index of polymer molecules is very similar to the refractive index of the smectic liquid crystals (31), so the polymer molecules cannot influence the transmittance of rays and the optical properties of the smectic liquid crystals (31), and the light modulation capability (referring to transmission capability and scattering capability) cannot be influenced, either. When the molecules of the smectic liquid crystals (31) are not aligned regularly, the rays cannot pass through the present medium due to the different refraction indices of the molecular axes of the smectic liquid crystals (31) in two directions, which is not affected by the polymer molecules. The present medium has the multi-stable characterizes which is caused by the molecule alignment memory property of the smectic liquid crystals (31) but not related to the polymer. However, the polymer structure formed by the polymer can increase the friction when the molecules of the smectic liquid crystals (31) are aligned. Therefore, the more the polymer molecules, the higher drive voltage and drive response time is required. The scattering effect is accordingly reduced also.

The thickness of the electrically controlled medium for modulating light is controlled from 100 to 400 um on average. The thickness of the mixture layer (3) is controlled from 5 to 20 um. If the thickness of the mixture layer (3) is less than 5 um or more than 20 um, the scattering effect is reduced and cannot meet the requirement of the present medium. In the present invention, the thickness of the mixture layer (3) is controlled by adding a certain number (several, dozens of, hundreds of . . . ) of spacer balls or spacer rods (not shown in the FIGS.), and the diameter of the spacer balls or the spacer rods is the thickness of the mixture layer (3). If the thickness of the mixture layer (3) is controlled from 5 to 20 um, then the number of the spacer balls or the spacer rods is generally controlled between 50 and 150 per square centimeters. However, the number of the spacer balls or the spacer rods should be properly determined according to the prescribed thickness of the mixture layer (3) and if the balls or the rods were selected. For example, if the prescribed thickness of the mixture layer (3) is controlled to 10 um, then 60 to 80 spacer balls or spacer rods need to be added per square centimeters. The diameter of the spacer balls is 10 um more or less, and the diameter of the cross section of the spacer rods is 10 um. The spacer balls or the spacer rods are mixed using the following methods: before the filling step, uniformly mixed a certain number of spacer balls or spacer rods with the smectic liquid crystals (31), monomers, dopants and then the mixture is then filled between the gap of the plastic film players (1) and (2); otherwise, before the filling step, uniformly sprayed a certain number of spacer balls or spacer rods on the plastic film players (1) and/or (2) on the surfaces facing to the mixture layer (3), and then, a mixture obtained by mixing the smectic liquid crystals (31), the monomers and the dopants are filled and sprayed in the gap of the plastic film players (1) and (2). The spacer balls or the spacer rods are made from polyester materials or glass. When the molecules of the smectic liquid crystals (31) are regularly aligned, the transmittance of rays and the optical properties of the smectic liquid crystals (31) cannot be affected by the spacer balls or the spacer rods, since the refractive index of the spacer balls or the spacer rods is very similar to the refractive index of the molecules of the smectic liquid crystals (31). In addition, the scattering and multi-stable property of the present medium cannot be affected by the spacer balls or the spacer rods neither.

As for the smectic liquid crystals (31), any siloxane compounds of the following formula (1) and formula (2) can be selected. The formula (1) here is called AB type liquid crystal, and the formula (2) here is called ABA type liquid crystal.

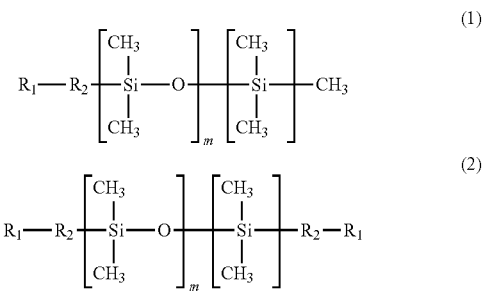

In the formula (1) and formula (2), R1 refers to 4-alkenoxy-4' cyanobiphenyl component, and R2 refers to alkyl chain. Based on work temperature request, the value of m is less than 8, generally 1 to 4, and the number of carbons in R2 is from 3 to 15. For example, for the AB type liquid crystal molecule of the formula (1), when the number of carbons in R2 is 10, and m is 1, the highest work temperature of the present medium is 60.8° C., so the medium is allowed to normally work and exhibits good multi-stable property, transmission, etc at a temperature below 60.8° C.; when the number of carbons in R2 is 6, and m is 1, the highest work temperature of the medium is 52.7° C.; when the number of carbons in R2 is 3, and m is 1, the highest work temperature of the medium is 35.7° C. For the ABA type liquid crystal molecule of the formula (2), when the number of carbons in R2 is 10, and m is 4, the highest work temperature of the medium is 62.8° C.; when the number of carbons in R2 is 6, and m is 4, the highest work temperature of the medium is 55.3° C.; when the number of carbons in R2 is 3, and m is 4, the highest work temperature of the medium is 30.1° C.; when the number of carbons in R2 is 3, and m is 3, the highest work temperature of the medium is 32.5° C. Thus, the more the number of carbons in R2, the larger the range of work temperature of the medium is. However, the voltage and the response time for driving the medium will increase with the number of carbons in R2. The value of m also has certain nonlinear effect on the work voltage and the response time.

The liquid crystal molecules are allowed to exhibit different molecule alignments by controlling the amplitude, frequency and driving time of the electric power applied to the electrode layers (4), so that the electrically controlled medium for modulating light can be switched between a blurredly scattering state and a fully transparent state.

The work principles of the medium are explored in details below.

Figure 2:
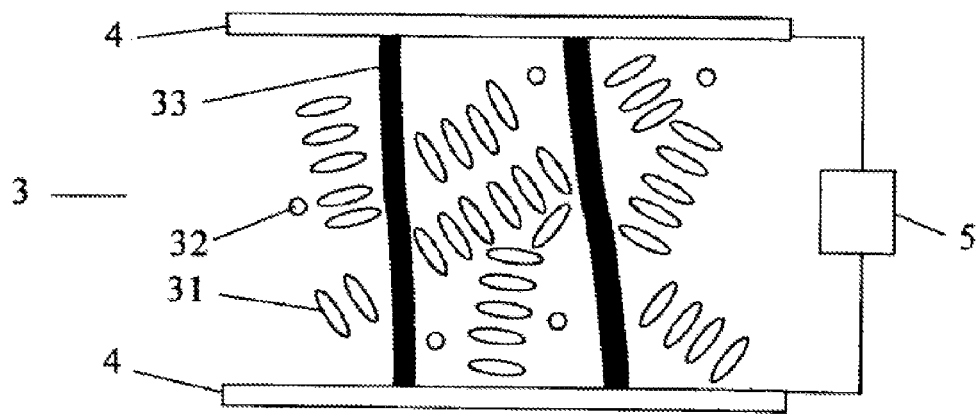
FIG. 2 is a form schematic view showing a mixture layer under the application of low frequency voltage.

As shown in FIG. 2, the thickness of the mixture layer (3) is 10 um, the weight rate of the dopants to the smectic liquid crystal (31) is less than 0.1:100, and before polymerization the weight rate of the monomers to the smectic liquid crystal (31) is less than 15:100. Applied an AC control voltage of 180 V, 50 Hz to the two electrode layers (4) by the circuit control device (5) (Actually, the voltage value is from 50 to 250 V, and the voltage frequency is from 50 to 200 Hz). The molecules of the smectic liquid crystals (31) in the mixture layer (3) are affected by the dopant molecules (32) to be twisted in less than one second when the voltage is applied, forming a random alignment as shown in FIG. 2. The anisotropy of the molecules of the smectic liquid crystals (31) (the different long optical axes that incident rays pass through the liquid crystal make the refraction angles of the liquid crystal different), causing the liquid crystal to have different refraction rates, makes the rays incident through the molecules of the smectic liquid crystals (31) refracted in different ways. The refraction rates of the rays make dynamic change in the mixture layer (3) of the thin layer, so the rays are strongly scattered. In the macroscopic scale, the medium produces the scattering effect and forms a fog scattering state like frosted glass.

Figure 3:
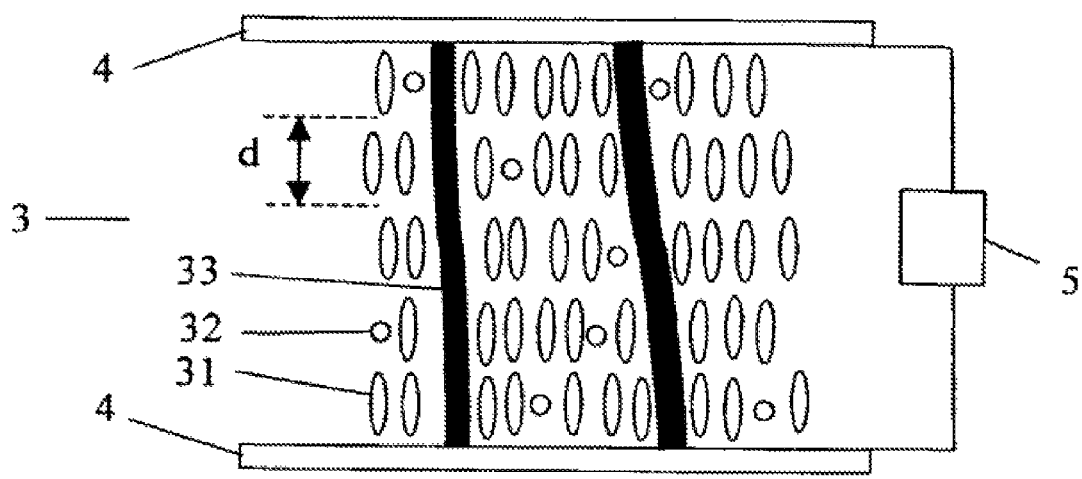
FIG. 3 is an alignment schematic view showing the first embodiment of the smectic liquid crystal under the application of high frequency voltage.
Figure 4:
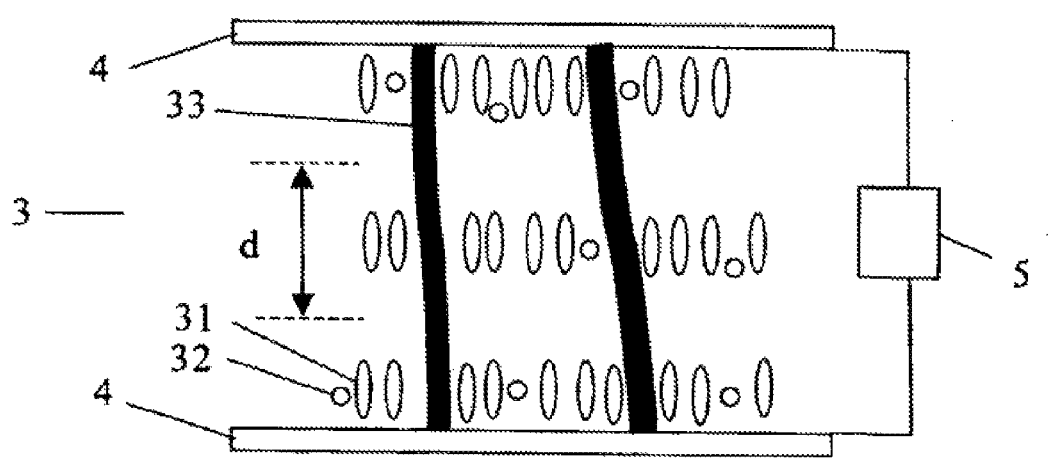
FIG. 4 is an alignment schematic view showing the second embodiment of the smectic liquid crystals under the application of high frequency voltage.

As shown in FIGS. 3 and 4, the thickness of mixture layer (3) is 2 um, the weight rate of the dopants to the smectic liquid crystal (31) is less than 0.01:100, and the weight rate of the monomers to the smectic liquid crystal (31) is less than 1:10 before polymerization. Applied an AC control voltage of 180 V, 50 Hz to the two electrode layers (4) by the circuit control device (5) (Actually, the voltage value is from 50 V to 250 V, and the voltage frequency is more than 1000 Hz). The molecules of the smectic liquid crystals (31) in the mixture layer (3) are aligned into a regular form under the application of an electric field in less than one second after the voltage is applied. At the moment, the long optical axes of the molecules of the smectic liquid crystals (31) are perpendicular to the planes of the electrode layers (4). The refraction rate of the rays incident through the molecules of the smectic liquid crystals (31) is very low. The rays can freely pass through the mixture layer (3). As the ray refractive indexs of both the polymer molecules (33) and the spacer balls or the spacer rods are very similar to the ray refractive index of the molecules of the smectic liquid crystals (31) at this alignment state, the transmittance of rays cannot be affected by the polymer molecules (33) and the spacer balls or the spacer rods. Therefore, the medium forms a full transparent state in the macroscopic scale.

For the molecules of the AB type and the ABA type liquid crystals, the light modulation principles are substantially identical. But the difference lies in that when the molecules of the smectic liquid crystals (31) are regularly aligned, the length ratio of the liquid crystal layer formed to the molecules of the liquid crystals are different. As shown in FIG. 3, the length "d" of the liquid crystal layers formed after the molecules of the ABA type liquid crystal are regularly aligned is almost equal to the length of the molecules of the liquid crystal. However, the length "d" of the liquid crystal layer which is formed after the molecules of the AB type liquid crystal are regularly aligned is about 1.7 times of the length of the molecules of the liquid crystals, as shown in FIG. 4.

After voltage is applied to the electrode layers (4) and the medium has produced such optical effects, as scattering, or transmission, etc. The conductivity of the dopants could keep the same optical effect as the electric power applied even the power is off, so the medium has multi-stable property. Power consumption was needed only when changing the alignment states of the liquid crystal molecules. In the present invention, the medium has multi-stable property since the conductive compound is employed in the dopants in the mixture layer (3). When voltage signals are applied to the electrode layers (4), ions in the conductive compound make reciprocating motion according to the variation of potential differences. The motion can change the alignment of the molecules of the liquid crystals, and the alignment of the molecules of the liquid crystals are stable after switched by the electric power and there is no need to keep constant motion of the ions. The multi-stable effect produced by the smectic liquid crystals (31) and the dopants are different from the maintaining effect produced by the PDLC technique. The liquid crystal mixed with the high molecular polymers needs to be maintained by the surface force, molecular force and friction force of the network of a large number of polymers in the PDLC technique.

Of course, the alignment of the molecules of the smectic liquid crystals (31) can be partially twisted by reasonably controlling the amplitude, frequency and driving time of electric power applied to the electrode layers (4) so as to produce the different scattering effects. Thus, the medium could showing various alignment of different grey scales between fog scattering and a fully transparent state, such as semi-transparent state, etc.

In the actual application, the monomers and the dopants can be properly added according to the thickness of the mixture layer (3). If the thickness of the mixture layer (3) is 10 um, the weight rate of the dopants to the smectic liquid crystal (31) is 0.05:100, and the weight rate of the monomers to the smectic liquid crystal (31) is 12:100 before polymerization. The thickness range and the mixing component ratio of the monomers and the dopants are not strict. The medium structure is to make the light modulation function.

For example, an AB type liquid crystal is employed as Smectic-A, m is 1, the number of carbons in R2 is 10, HMAP is employed as the dopants, NOA65 is employed as the monomers, the weight rate of the dopants to the smectic liquid crystal (31) is 0.04:100, the weight rate of the monomers to the smectic liquid crystal (31) is from 8:100 to 10:100, the diameter of the spacer balls is 10 um, and the number of the spacer balls is controlled in a range of 60 to 80 per square centimeter. The liquid crystal, HMAP, NOA65 material and the spacer balls are uniformly mixed and filled between two plastic thin film layers (1) and (2). The thickness of the mixture layer (3) is from 10 to 12 um. Then, the mixture layer (3) is cured by ultraviolet rays at a temperature of 140° C., and the medium is prepared. The medium can work at a temperature below 60° C. The response time is less than one second when the medium is affected by an An AC voltage of 180 V, 50 Hz more or less. The transmittance of the medium reaches more than 0.8. The response time is less than one second when the medium is affected by an AC voltage of 180 V, 1000 Hz. The medium have the advantages of good scattering effect, stable scattering state, good multi-stable property and good bonding properties between the two film layers. The light modulation of the medium cannot be obviously changed by the polymer molecules and the spacer balls after polymerization. Similarly, other things (selection of the components, etc, the thickness of the mixture layer (3), preparing ratio, etc) being equal, an ABA type liquid crystal is employed as Smectic-A, m is 4, and the number of carbons in R2 is 10, then the medium having the advantages of transmittance more than 0.8, stable scattering state, excellent multi-stable property and good bonding ability can be realized.

Another example, an AB type liquid crystal is employed as Smectic-A, m is 2, the number of carbons in R2 is 10, CTAB is employed as the dopants, NOA65 is employed as the monomers, the weight rate of the dopants to the liquid crystal is 0.05:100, and the weight rate of the monomers to the liquid crystal is 1:10. The liquid crystal, CTAB and NOA65 material are uniformly mixed and filled between two plastic thin film layers (1, 2). The spacer balls of which the diameter is 10 um are uniformly sprayed on the two plastic thin film layers (1, 2). The number of the spacer balls is controlled in a range of 60 to 80 per square centimeter, and the thickness of the mixture layer (3) is from 10 to 12 um. Then, the mixture layer (3) and the spacer balls are cured by ultraviolet rays at a temperature of 140° C., and the medium is prepared. The medium can work at a temperature below 60° C. The response time is less than one second when the medium is affected by an AC voltage of 180 V, 50 Hz more or less. The transmittance of the medium reaches more than 0.8. The response time is less than one second when the medium is affected by An AC voltage of 180 V, 1000 Hz. The medium have the advantages of good scattering effect, stable scattering state, good multi-stable property and good bonding properties between the two film layers. The light modulation of the medium cannot be obviously changed by the polymer and the spacer balls are after polymerization. Similarly, other things (selection of dopants, etc, the thickness of the mixture layer (3), preparing ratio, etc) being equal, an ABA type liquid crystal is employed as Smectic-A, m is 6, and the number of carbons in R2 is 10, then the medium having the advantages of transmittance more than 0.8, stable scattering state, excellent multi-stable property and good bonding ability can be realized.

Figure 5:
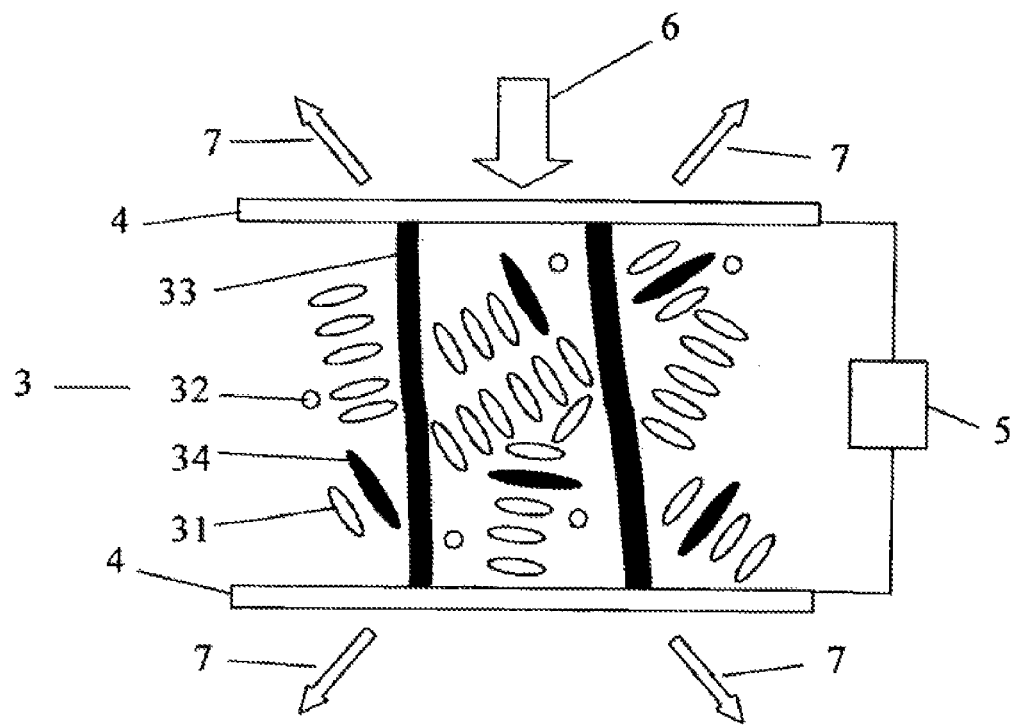
FIG. 5 is a form schematic view showing the mixture layer under the application of low frequency voltage when a dichroic dye is mixed.
Figure 6:
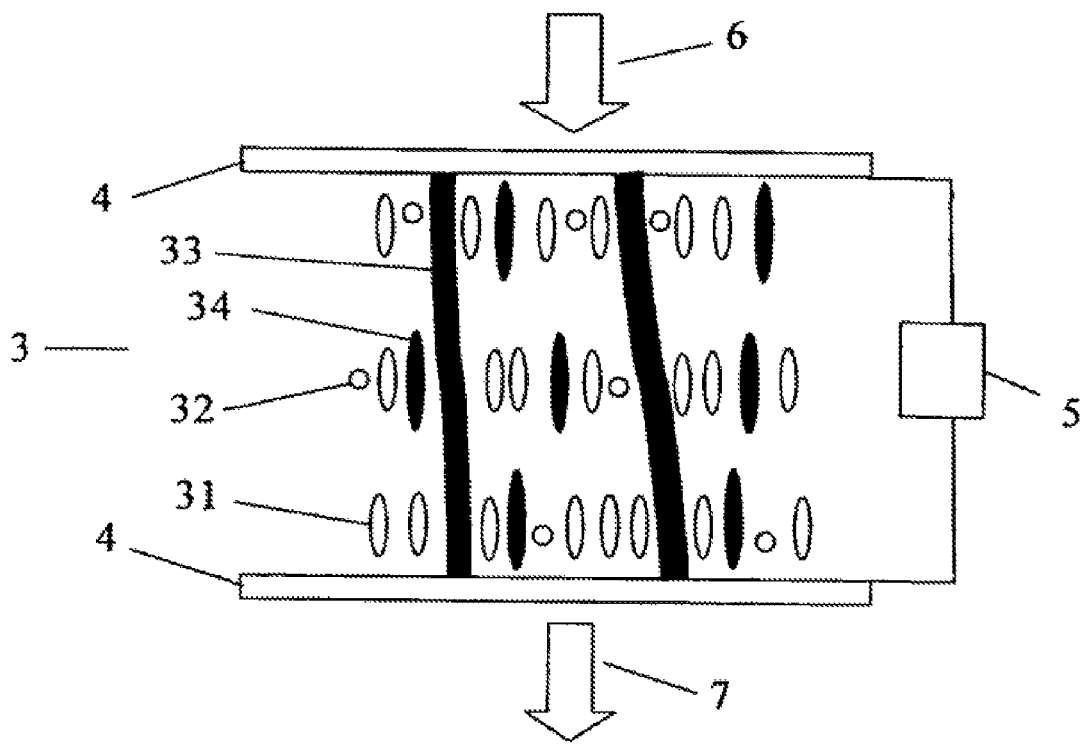
FIG. 6 is a form schematic view showing the mixture layer under the application of high frequency voltage when the dichroic dyes is mixed.

As shown in FIGS. 5 and 6, a certain number of dichroic dyes, such as faint yellow azo dichroic dyes, can also be mixed in the mixture layer (3). The ratio of the dye is generally from 1% to 3% based on the total weight of the mixture. The medium can switch states between a fully transparent state and a colour scattering state by adding a proper number of dichroic dyes into the mixture layer (3). In the present invention, long molecule type dichroic dyes is employed as the dichroic dyes. The structure of the dichroic dyes is similar with the optical axis structure of the smectic liquid crystals (31). The absorption capability of the rays is very weak along the direction parallel to the long optical axis. But the the dichroic dyes molecules (34) can absorb many rays of a certain wavelength along the direction perpendicular to the long optical axis.

As shown in FIG. 5, when an AC voltage, 50 to 250 V, 50 to 200 Hz, is applied to the two electrode layers (4), the molecules of the smectic liquid crystals (31) in the mixture layer (3) are twisted and aligned into a random form in less than one second. As the spacing between the molecules (34) of the dichroic dyes and the molecules of the smectic liquid crystal (31) is very small, the dichroic dyes molecules (34) are also changed into a random form when the smectic liquid crystals molecules (31) are twisted. The long optical axes of a large number of the dichroic dyes molecules (34) are even parallel to the planes of the electrode layers (4). When the rays (6) are incident through the mixture layer (3), the rays are strongly scattered due to the refraction difference of the smectic liquid crystals molecules (31) for the rays. A large number of rays are incident through the dye molecules (34) along the direction perpendicular to the long optical axes of the dye molecules (34) after the rays are scattered by the smectic liquid crystals molecules (31), so most of the rays of a certain wave band are absorbed by the dye molecules (34). Scattered rays (7) show the color of the dye molecules (34) (the color presented varies with the structure of the dichroic dyes). Thus, the medium, at the moment, shows certain color and keeps a fog blurred colour scattering state in a macroscopic scale. In the actual application, the dyes of different colors can be mixed with the smectic liquid crystals (31), thereby making the medium show different colors, visual light spectrum can be uniformly absorbed by the dye molecules (34) to form dark grey.

As shown in FIG. 6, when AC voltage, 50 to 250 V, more than 1000 Hz, is applied to the two electrode layers (4), both the smectic liquid crystals molecules (31) and the dichroic dyes molecules (34) in the mixture layer (3) are regularly aligned in less than one second. At the moment, both the long optical axes of the molecules of the smectic liquid crystals (31) and the long optical axes of the dichroic dyes molecules (34) are perpendicular to the planes of the electrode layers (4), so the rays incident through the smectic liquid crystals molecules (31) of the cannot be largely refracted. In addition, as the long optical axes of the dichroic dyes molecules (34) of are perpendicular to the planes of the electrode layers (4), the rays are incident along the direction parallel to the long optical axes of the dichroic dyes molecules (34) and the dichroic dyes molecules (34) only absorb small amount of incident rays (the absorption number of the rays depends on the regular alignment degree and the solubility of the dye molecules (34) in relation to the molecules of the liquid crystal). Only a small number of rays are absorbed after the incident rays 6 pass through the mixture layer (3), and the rays eventually freely pass through the mixture layer (3) (rays 7 as shown in FIG. 6). Thus, the medium forms a full transparent state in a macroscopic scale.

The smectic liquid crystals molecules (31) are long molecules which have high birefringence. In the actual application, the molecular chains of the smectic liquid crystals molecules (31) can be adjusted to reduce the birefringence of smectic liquid crystals (31). As a consequence, the refraction rates of the rays are very approximate in the direction parallel to the long optical axes of the smectic liquid crystals molecules (31) and in the direction perpendicular to the long optical axes of the molecules of the smectic liquid crystals (31). The scattering effect of the molecules of the liquid crystal in the twisted state is accordingly weakened. The mixture layer (3) mixed with the dye cannot have obvious scattering phenomena. Instead, the dye molecules (34)

absorbing the rays in the range of a certain wave length like a colored filter disk. The medium cannot give a foggy blurred feeling at the moment, but forms a clear colour scattering state. The mixture layer (3) mixed with the dye also realizes multi-stable property by the molecules of the dopants, and is bonded with the two plastic thin film layers (1, 2) by polymer molecules (33).

Figure 7:
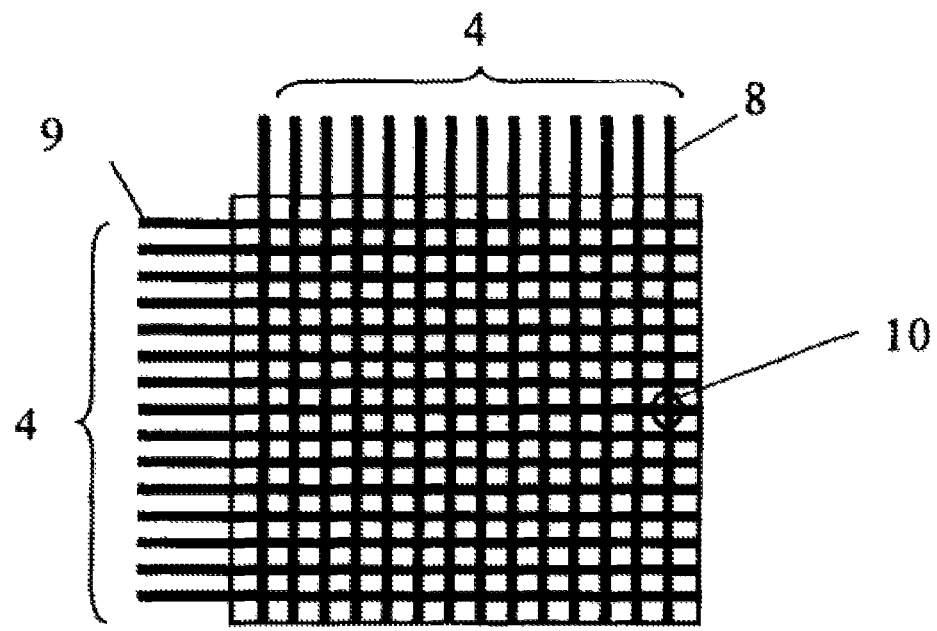
FIG. 7 is a schematic view of Electrode layers cut into horizontal and vertical arrays.
Figure 8:
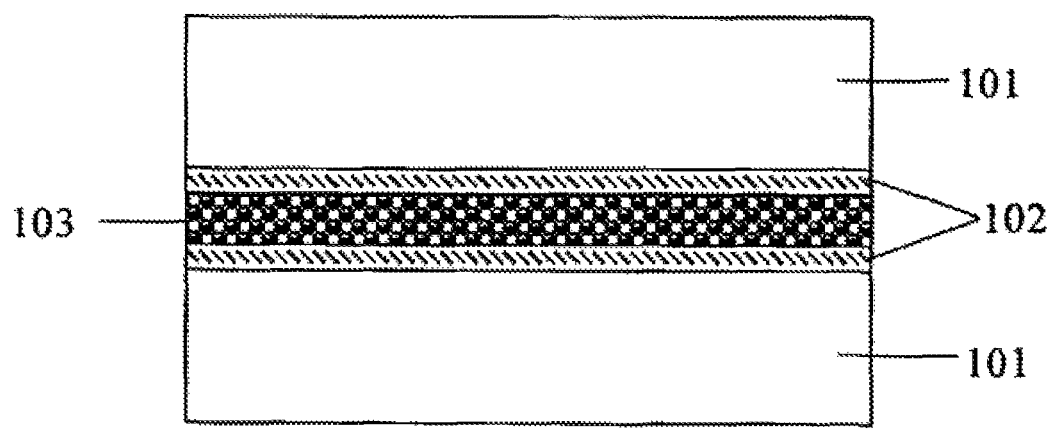
FIG. 8 is a side sectional view showing a liquid crystal polymer of known type.
Figure 9:
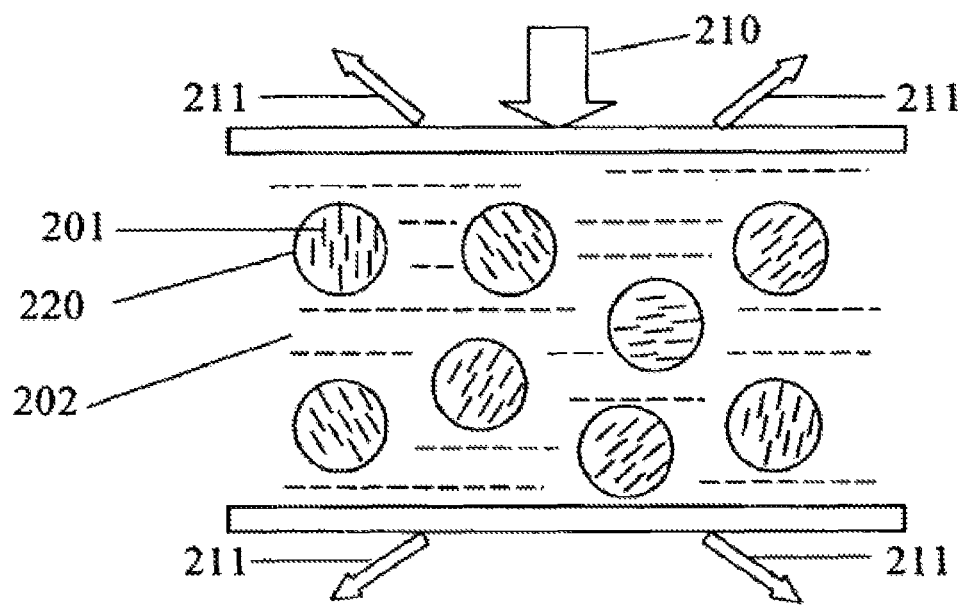
FIG. 9 is an alignment schematic view showing the liquid crystal with no electric power applied.
Figure 10:
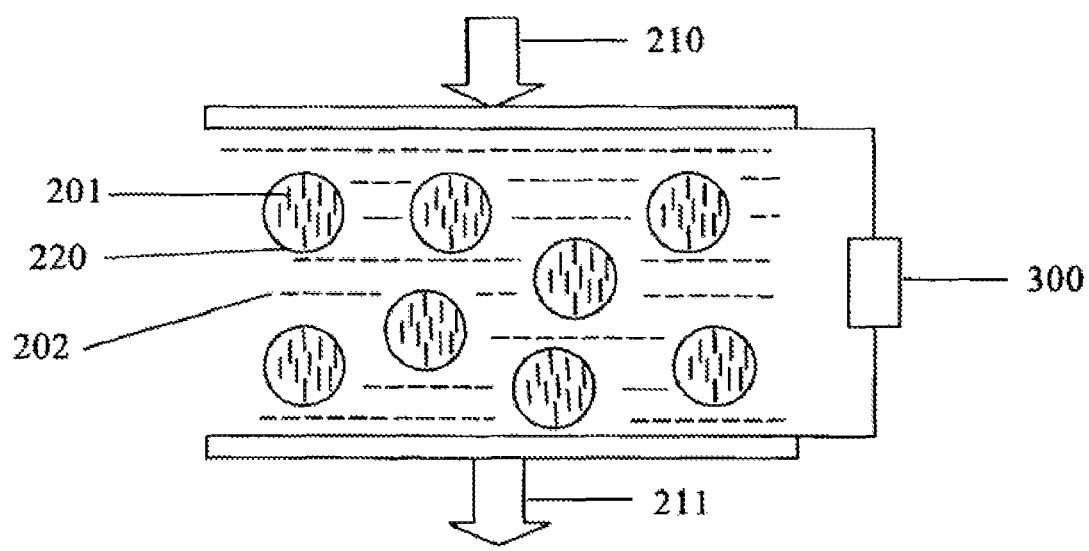
FIG. 10 is an alignment schematic view showing the liquid crystal under the condition of a certain electric field.

In the real application, the electrode layers (4) can be patterned as a plurality of strip-shaped electrodes according to the product requirements of logo or words, as shown in FIG. 7, one conductive electrode layer 4 is cut into a plurality of parallel arranged strip-shaped electrodes (8), the other conductive electrode layer 4 is cut into a plurality of strip-shaped electrodes (9) arranged in parallel, and the two electrode layers form a pixel dot array. The transmittance of the pixel dots (10) in the crossed positions of the horizontal and the vertical electrodes is controlled by controlling the electric signals on the strip-shaped electrodes (8) and the strip-shaped electrodes (9), so various patterns, figures and even words are displayed. For example, firstly, the whole mixture layer (3) forms a fog shielding or a colour scattering state by applying low frequency voltage; then, one line of strip-shaped electrodes (9) is accordingly driven when one line of strip-shaped electrodes (8) is affected by high frequency voltage signals (the voltage for driving the strip-shaped electrodes (9) is on average two times of the voltage for driving the strip-shaped electrodes (8)); the drive signals for the rest lines of the strip-shaped electrodes are zero, in which makes the pixel dots (10) driven in the crossed positions of the horizontal and the vertical electrodes transparent state; then the transmittance control of a pixel dot is completed. Then all strip-shaped electrodes (8) are driven line by line, and the strip-shaped electrodes (9) are accordingly driven in order to make patterns, figures or words formed on the medium.

The dimension of the pixel dots can be customized, which depends on the design of the electrode layers. If all pixel dots are small, the medium can be used as a display for displaying rich pattern and work information. When the medium serves as a display, one reflector board of various colors, such as paper, plastics, fiber products, wood products or metal products, etc can be attached to one side of the medium. Thus, the contrast of the display content can be effectively improved.

The invention has the advantages that:

1. The molecules of the smectic liquid crystals can exhibit different molecule alignments by controlling the electric signals applied on the electrode layers. As a consequence, the medium can switch states between a blurredly scattering state and a fully transparent state, and even may be switched among a plurality of gradual translucent states of different gray levels. The transmittance of the medium is over 80% when the LC molecular is on fully transparent state. When the LC molecular is on a blurredly scattering state and the scattering state is very stable and the medium can meet the light modulating requirements.

2. The light modulating medium could keep the same optical transmittance state even when the power is off, and the medium also has multi-stable property. The medium requires low driving current. Power consumption was needed only when changing the alignment states of the liquid crystal molecules. The medium is eco friendly because of the medium has less electromagnetic radiation and toxic.

3. The conversion between a blurredly scattering state and a fully transparent state needs a very short time, from several milliseconds to tens of milliseconds on average. It could be faster when the medium is switched to different gray levels.

4. The medium consists of a thin mixture layer and plastic thin film layers, so the medium is very thin. The polymer materials is formed from monomers by thermal curing or ultraviolet curing, and the two plastic thin film layers can be well bonded together by the polymer materials, so the medium having the advantages of pressure and crack resistance can be arbitrarily attached to flat or curved objects, such as glass, rigid plastic, walls, etc.

5. The medium can show different colors when it was mixed with dichroic dyes, If the electrode layers are cut into a plurality of strip-shaped electrodes arranged in parallel, and formed a pixel array between the two electrode layers, various patterns, figures or words can be displayed on the medium by controlling electric signals so the medium can even be used as monitors.

The electrically controlled medium for modulating light can be broadly used for the fields of architectural decoration, privacy control areas, automotive electronics and glass, etc.

Besides, one layer of protective film can be attached to the outer surfaces of the plastic thin film layers (1, 2) for preventing film scratches when the medium is used. In the present invention, electric signal control can be realized by the means of wire connection, remote control or ray self induction. The control means all belong to the known techniques, so the control means are not stated here.

The invention claimed is:

1. An electrically controlled medium for modulating light, comprising:
    two plastic thin film layers;
    a mixture layer arranged between the two plastic thin film layers, wherein the mixture layer comprises smectic liquid crystals, polymer materials and one or more dopants; and
    electrode layers coated on one side of each of the two plastic thin film layers facing to the mixture layer,
    wherein the electrode layers are configured to be connected to an electrical driving system,
    wherein the formula of the smectic liquid crystals is

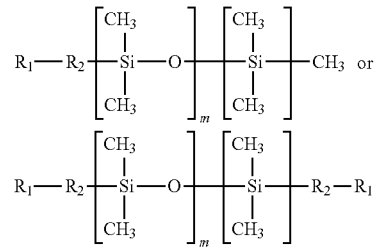

wherein, R1 refers to 4-alkoxy-4' cyanobiphenyl compound, and R2 refers to an alkyl chain,
    wherein m is a positive integer, and
    wherein the one or more dopants comprise hexadecyl trimethyl ammonium perchlorate.

2. The electrically controlled medium for modulating light as claimed in claim 1,
    wherein the mixture layer comprises one of spacer balls and spacer rods uniformly mixed for controlling a thickness of the mixture layer,
    wherein the thickness of the mixture layer is in a range of 5 μm to 20 μm, and
    wherein a thickness of the electrically controlled medium is in a range of 100 μm to 400 μm.

3. The electrically controlled medium for modulating light as claimed in claim 1, wherein the polymer materials are formed from monomeric materials by thermal curing or ultraviolet curing.

4. The electrically controlled medium for modulating light as claimed in claim 3, wherein a weight ratio of the monomeric materials relative to the smectic liquid crystals before polymerization is less than 3:10, and wherein a weight ratio of the one or more dopants relative to the smectic liquid crystals is less than 1:100.

5. The electrically controlled medium for modulating light as claimed in claim 4, wherein the monomeric materials are optical adhesive compound.

6. The electrically controlled medium for modulating light as claimed in claim 1, wherein a value of m is in a range of 1 to 4, and a number of carbons in R2 is in a range of 3 to 15.

7. The electrically controlled medium for modulating light as claimed in claim 1, wherein the mixture layer further comprises dichroic dyes.

8. The electrically controlled medium for modulating light as claimed in claim 2, wherein the polymer materials are formed from monomeric materials by thermal curing or ultraviolet curing.

9. The electrically controlled medium for modulating light as claimed in claim 2, wherein the mixture layer further comprises dichroic dyes.

10. The electrically controlled medium for modulating light as claimed in claim 4, wherein the weight ratio of the monomeric materials relative to the smectic liquid crystals before polymerization and the weight ratio of the one or more dopants relative to the smectic liquid crystals depend on a thickness of the mixer layer.

11. The electrically controlled medium for modulating light as claimed in claim 10, wherein, when the mixer layer has a thickness of 10 μm, the weight ratio of the monomeric materials relative to the smectic liquid crystals before polymerization is less than 15:100 and the weight ratio of the one or more dopants relative to the smectic liquid crystals is less than 0.1:100.

12. The electrically controlled medium for modulating light as claimed in claim 11, wherein, when the mixer layer has a thickness of 10 μm, the weight ratio of the monomeric materials relative to the smectic liquid crystals before polymerization is set to be 12:100 and the weight ratio of the one or more dopants relative to the smectic liquid crystals is set to be 0.05:100.

13. The electrically controlled medium for modulating light as claimed in claim 10, wherein, when the mixer layer has a thickness of 12 μm, the weight ratio of the monomeric materials relative to the smectic liquid crystals before polymerization is less than 10:100 and the weight ratio of the one or more dopants relative to the smectic liquid crystals is less than 0.01:100.

14. The electrically controlled medium for modulating light as claimed in claim 4, wherein, when the mixer layer has a thickness of 10 μm, the weight ratio of the monomeric materials relative to the smectic liquid crystals before polymerization is from 8:100 to 10:100 and the weight ratio of the one or more dopants relative to the smectic liquid crystals is less than 0.04:100.

* * * * *